United States Patent Office 3,224,639
Patented Dec. 21, 1965

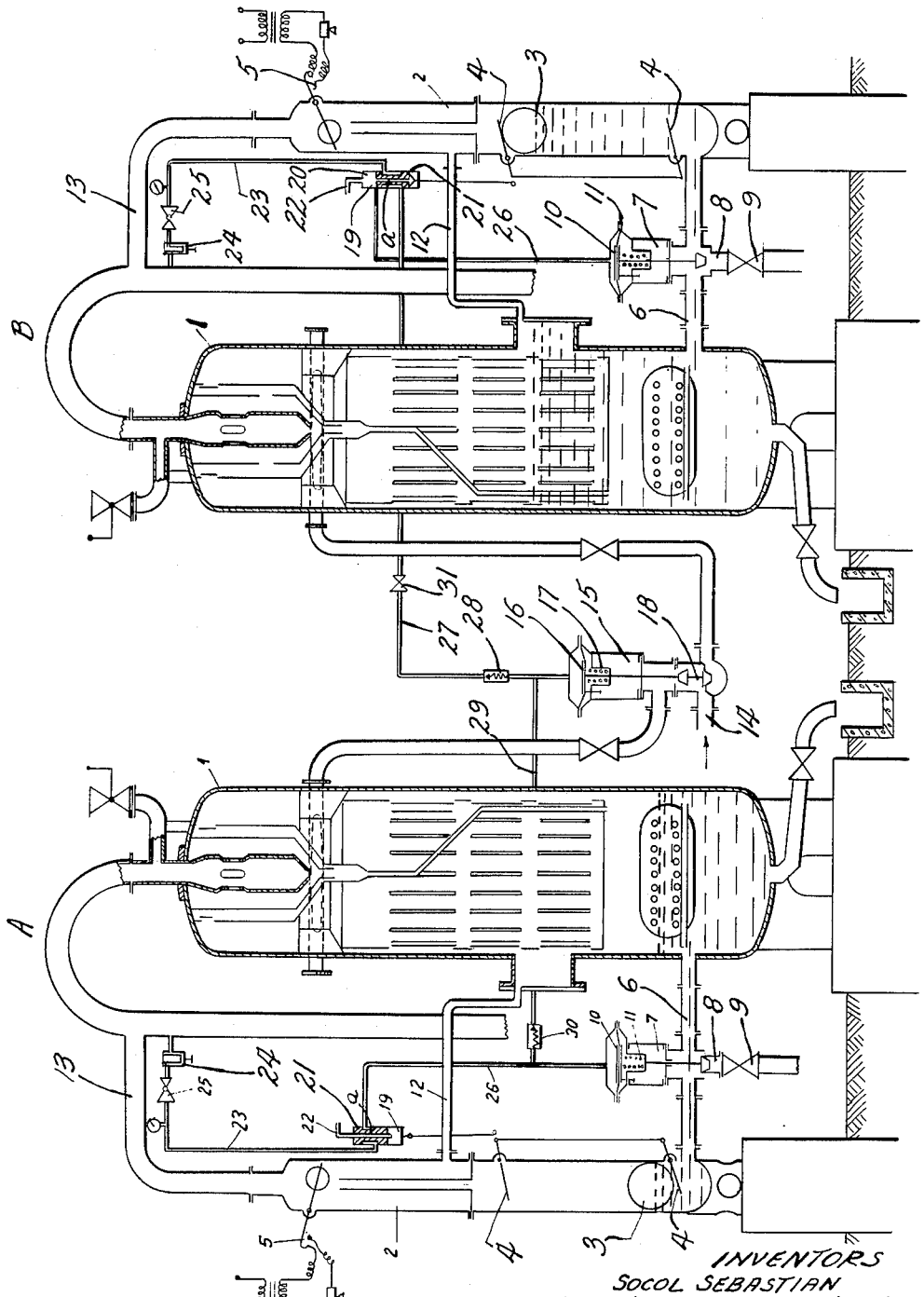

3,224,639
MEANS FOR AUTOMATICALLY CONTROLLED DISCHARGING AND METERING OF LIQUIDS FROM OIL AND GAS SEPARATORS
Socol Sebastian and Evghenide Constantin, Bucharest, and Iacob Ioan and Ionăscut Arion, Cimpina, Rumania, assignors to Ministerul Industriei Petrolului si Chimiei, Bucharest, Rumania, a firm of Rumania
Filed July 30, 1964, Ser. No. 386,357
7 Claims. (Cl. 222—68)

The present invention relates to a method for automatically and simultaneously discharging and metering liquids from oil and gas separators. The method of this invention gives satisfactory results when being applied to oil storage tank farms where flow rates vary within very wide ranges.

Methods are already known for the controlled discharge of fluids from oil and gas separators and for metering the discharged liquids by means of a float mounted in the separator, whereby the float actuates a valve type device discharging the constant fluid volumes accumulated in the separator between two pre-determined levels.

While this method allows the discharge and metering of high liquid rates using the separator itself for a measuring chamber, it has the disadvantage that, owing to the large size of the float actuating the discharge valve on which both the hydrostatic and gas pressure in the separator are imposed, the liquids are discharged at variable levels, that means the liquid volumes which are being discharged are not constant, thus introducing variable factors which result in inaccurate measurements.

Another well-known method consists of connecting a conventional oil field separator to another metering separator which usually is of smaller volume, in order to obtain higher accuracy. The liquid discharge in this known device is controlled by a spherical float which is actuated by the use of two levers and an air controlled valve system which accomplishes thus automatically the filling and discharging stages of the metering separator. The disadvantage of this method is the low capacity of the metering separator to which the fluids from the main separator are intermittently supplied, as the volume of the latter is always larger than that of the metering separator, which means that in the case of high well production rates the main separator must remain idle over certain periods of time due to the metering separator not being able to handle high production volumes.

The method according to the present invention eliminates these disadvantages in that it simultaneously accomplishes the discharging and filling stages of the main separator and respectively the metering separator which are connected to each other on the principle of directly communicating the two vessels, whereby the filling and discharging stages take place when the float mounted on the metering separator reaches the maximum or minimum pre-determined level.

In order to prevent well production fluid from entering the main separator during the discharge stage, two identical separator groups are used, each group consisting of a main separator and a metering separator, the groups being operated alternately, that means to say that the charging stage of each separator group is controlled by the float action of a float mounted in the metering separator of the other group when the float reaches a pre-determined maximum level.

The main separator is connected to the metering separator by means of connecting pipes at suitable levels and the well production is directed to one of the two separator groups through a pneumatically controlled three-way valve which is alternately and automatically operated by two pneumatic distributors mounted on each separator group, said pneumatic distributors being mechanically connected to the levers actuated by the float on the metering separator, said pneumatic distributors also control the discharging valves. In the pipe supplying pressure to the valves there are provided check-valves which prevent the pneumatically controlled valves from opening before the float in the metering separator reaches the pre-determined level.

To eliminate the pressure differences which occur in the cylinder of the pneumatically controlled distributors between the top and bottom of the slide-valve during its up- and down stroke and also for the purpose of removing through the low pressure gas pipe the gas used as working fluid, the slide-valve has an inner central bore connecting the top and bottom of the cylinder.

The aforementioned as well as additional objects, features, and advantages of the present invention will become more clearly apparent from the following detailed description thereof which is to be read with reference to the accompanying drawings, in which the single figure illustrates two groups of separators forming part of this invention, which operate alternately.

According to the invention, the metering unit includes two separator groups A and B consisting each of a main separator 1 of the conventional type and a metering separator 2 provided with float type control of the liquid level 3 and the levers 4 as well as the float type overflow signal device 5 of known design. The main separator is directly connected to the metering separator so that the two separators operate on the principle of communicating vessels: a lower pipe 6 connects both separators by means of flanges which secure the exit of oil through pipes; the pipe 6 of each group incorporates a pneumatically controlled two-way valve 7, the outlet pipe 8 is provided for emergency cases with a manual controller 9. The pneumatically controlled valve 7 contains the diaphragm 10 and spring 11, so that when pressure is applied on the diaphragm 10 the spring 11 is compressed and the valve closes the outlet pipe 8. When the pressure stops acting on the diaphragm 10 the spring 11 opens the outlet pipe 8.

A second pipe 12 connecting the main separator 1 to the metering separator 2 is mounted by means of a flange in the manhole (gauge-hole) of the main separator and in the inlet connection of the separating chamber of the metering separator, to facilitate liquid flow from the main separator 1 to the metering separator 2 when operation of the overflow signal device 5 is called for in the case the liquid outlet becomes plugged.

A third connecting pipe 13 for gas pressure equalization in both separators, is mounted between the gas header of the main separator 1 and the gas header of the metering separator 2.

The feed lines to the main separator 1 are connected to the flow-line 14 through a pneumatically controlled three-way valve 15 equipped with the diaphragm 16 and spring 17 and the double valve 18, so that when pressure acts on the diaphragm 16 the spring 17 is compressed causing the lower valve to close the inlet to the main separator 1 in the group B, whereby the inlet to the main separator 1 in group A opens. When the pressure acting on the diaphragm 16 is removed, the spring 17 causes the upper valve to close the inlet to the main separator 1 in group A, and opens the inlet to the main separator 1 in group B.

The pneumatic control is achieved by means of a pneumatically controlled distributor 19 consisting of a cylinder 20 and a slide-valve 21 having a central bore *a* which serves to equalize the pressure above and below the slide-valve during its stroke. An auxiliary pipe 22 is mounted at the upper part of cylinder 20 and connected to the low pressure gas pipe.

The gas header on the main separator supplies gas to the pneumatic distributors through pipe 23 fitted with the filter 24 and the pressure reducer 25. The gas operating the valves 7 is supplied from the pneumatic distributors 19 through a pipe 26 connected to the upper part of cylinder 20. For the operation of the pneumatically controlled three-way valve 15 there is provided a pipe 27 connecting the pneumatic distributor 19 in group B at the lower part of cylinder 20 to the upper chamber of diaphragm 16 in the valve 15. The pipe 27 is equipped with a check-valve 28 which permits the gas to unidirectionally flow from the pneumatic distributor 19 in group B to the valve 15, preventing however the gas from flowing back. Between valve 28 and valve 15 a pipe 29 branches off to connect pipe 27 to pipe 26 in group A. In this pipe a check-valve 30 is mounted so as to permit the unidirectional gas flow from pipe 27 to pipe 26, preventing however the backflow of the gas.

In the case a failure should occur, a manual controller 31 is provided, which is normally held in open position, in the pipe 27 between the pneumatic distributor 19 in group B and the check-valve 28.

For metering the discharged liquid rates each separator group is equipped with an electrically, mechanically or pneumatically controlled counter indicating the constant liquid volumes being delivered, this counter is not illustrated in the figure.

The aforedescribed device of our invention operates as follows: The production of the well is led over line 14 to the pneumatically controlled three-way valve 15 which directs the well fluids to one of the two separator groups, for instance group B, delivering it into the main separator 1 where the liquid-gas separation is accomplished. Through line 6 the liquid flows into the metering separator 2 where it raises the spherical float 3.

On reaching the maximum pre-determined level, the spherical float 3 will actuate the upper lever 4 which by means of mechanical connections will pull downward the slide-valve 21 of the pneumatic distributor 19 thus permitting the gas actuating through pipe 26, on the diaphragm 10 of the pneumatic valve 7 to exit via the low-pressure pipe 22, whereby the liquid outlet for both separators 1 and 2 of the group B opens to line 8, and on the other hand permits the gas separated in the separator 1 and led through the filter 24 and the pressure reducer 25 to enter the line 27.

The gas entering the line 27 and the check-valve 28 causes the three-way valve 15 to shut the inlet for the well production to the separator group B and to open the inlet to the separator group A. At the same time, the gas entering the line 29 and the check-valve 30 actuates the valve 7 in group A to maintain this outlet closed. The valve 7 is simultaneously acted upon also by the pressure of the gas led across the pneumatic distributor 19 and line 26 in group A.

When the liquid in the separator group B reaches the minimum pre-determined level, the float 3 operating the lower lever 4 pushes upward the slide-valve 21 of the pneumatic distributor 19, permitting the gas access through line 26 to the diaphragm 10 of the pneumatic valve 7, which also closes the liquid outlet to line 8. At the same time, the gas access across line 27 to the diaphragm 16 of the three-way valve 15 is closed, the valve 15 however does not change its position, since by closing the check-valve 28 the pressure available above the diaphragm continues to be maintained and the valve 30 remains also closed due to the pressure existing in the line 26.

The filling-discharging cycle is identically repeated in the separator group A and the three-way valve 15 eventually changes its position when the valve 7 in group A opens due to the pressure being removed from lines 26 and 29 when these lines are opened so as to communicate with the low pressure pipe 22 via the slide-valve 21 of the pneumatic distributor 19 in the separator group A.

In the case of a failure, which may cause the outlet to become plugged owing to the liquid rising beyond the predetermined level, an overflow signal device 5 will announce the failure at a local or remote station.

In the event of the breakdown of one separator group, the operations can be continued with the other group by manually setting the pneumatic three-way valve 15 in the opened position toward the operating group and closing the manual controller 31 in the gas pipe 27. As described above the well production continues to be fed to the main separator 1; the discharged liquid volume is determined by summing up the constant volumes being discharged and recorded by the counter previously mentioned above (not illustrated in detail), and the liquid volumes filling the separator during the discharge stage are determined by the use of suitable charts.

The method for controlled discharging and automatic metering of liquids from oil and gas separators according to the invention, has the following advantages:

It permits the separation and accurate metering of large crude oil volumes in the tank farms, by using a metering separator of small diameter for controlling the liquid delivery, while the discharging takes place simultaneously from both separators.

The system can easily be adapted to any type of existing oil field separator.

Without further analysis, it will be obvious to those skilled in the art, upon a study of this disclosure, that this invention permits various modifications and alterations without omitting features that, from the standpoint of prior art, fairly constitute essential characteristics of the generic or specific aspects of this invention, and therefore, such modifications and alterations are intended to be comprehended within the meaning, scope and range of equivalence of the following claims.

We claim:

1. A device for controlling and automatically metering the flow of fluids, comprising in combination, two pairs of storage tanks, each pair of tanks including a first tank and a second tank, inlet pipe means connected to said first tank in each pair of tanks for conducting fluid thereto, first pneumatically operated check valve means operatively mounted in said inlet pipe means for selectively directing said fluid to one of said two pairs of tanks, outlet pipe means connecting each pair of tanks, second and third pneumatically operated check valve means respectively operatively mounted in said outlet pipe means for each of said two pairs of tanks for selectively alternately providing an outlet conduit for liquid respectively stored in one of said two pairs of tanks, float means operatively mounted in each metering tank of said two pairs of tanks, and pneumatic means operatively connected to said float means for operatively selectively actuating said first, second and third pneumatically operated check valves, whereby fluid is alternately selectively conducted to one of said two pairs of tanks by said first pneumatically operated check valve and is alternately selectively discharged via said outlet pipe means by the agency of said second and third pneumatically operated check valves.

2. A device for controlling and automatically metering the flow of fluids, comprising in combination, two pairs (A, B) of storage tanks, each pair of tanks including a separator tank (1) and a metering tank (2), inlet pipe means (14) connected to said separator tank in each pair of tanks for conducting fluid thereto, first pneumatically operated check valve means (15, 16, 17, 18) operatively mounted in said inlet pipe means (14) for selectively directing said fluid to one of said two pairs of tanks (A, B), outlet pipe means (6, 9) connecting each pair of tanks, second and third pneumatically operated check valve means (7, 8, 10, 11) respectively operatively mounted in said outlet pipe means (6, 9) for each of said two pairs of tanks (A, B) for selectively alternately providing an outlet conduit for liquid respectively stored in one of said two pairs of tanks, float means (3) operatively mounted in each metering tank (2) of said two pairs of tanks (A, B), and pneumatic means (19, 20, 21, 22, 23, 24, 25, 26, 27, 28, 29, 30, 31) operatively connected to said float means (3) for operatively selectively actuating said first (15, 16, 17, 18), second (7, 8, 10, 11) and third (7, 8, 10, 11) pneumatically operated check valves, whereby fluid is alternately selectively conducted to one of said two pairs of tanks (A, B) by said first pneumatically operated check valve (15, 16, 17, 18) and is alternately selectively discharged via said outlet pipe means (6, 9) by the agency of said second and third pneumatically operated check valves (7, 8, 10, 11).

3. The device as set forth in claim 2, wherein said separator tank and said metering tank of each pair of tanks are in communication with each other at at least two different levels in each tank by the agency of at least two connecting pipes.

4. The device as set forth in claim 2, wherein said first pneumatically operated check valve means comprises a three-way valve operatively mounted in said inlet pipe means, said three-way valve including a pneumatically actuated diaphragm, the operation of which is controlled by said pneumatic means.

5. The device as set forth in claim 2, wherein said pneumatic means comprises a pair of cylinders, each of which is respectively connected by first pipe means to said separator tank in each pair of tanks, piston means respectively slidably disposed in each cylinder of said pair of cylinders, each cylinder of said pair of cylinders being respectively connected by second pipe means to said second and third pneumatically operated check valve means.

6. The device as set forth in claim 5, wherein said second and third pneumatically operated check valve means respectively comprise check valves mounted in said outlet pipe means, each of said check valves having a pneumatically actuated diaphragm mounted therein, the operations of said diaphragms being controlled by said pneumatic means.

7. The device as set forth in claim 6, wherein each cylinder of said pair of cylinders includes pressure relief valve means, and wherein each of said piston means is provided with a central bore.

References Cited by the Examiner

FOREIGN PATENTS 10,494   5/1899   Great Britain.

LOUIS J. DEMBO, *Primary Examiner.*

HADD S. LANE, *Examiner.*